United States Patent
Al-Amin et al.

(10) Patent No.: US 6,217,065 B1
(45) Date of Patent: Apr. 17, 2001

(54) INFLATOR

(75) Inventors: Ahmad K. Al-Amin, Higley; Timothy A. Swann, Mesa; Bryan W. Shirk, Mesa; Roy D. Van Wynsberghe, Mesa; Eric C. Erike, Mesa; Vincent J. Mramor, Chandler, all of AZ (US)

(73) Assignee: TRW Inc., Lydhurst, OH (US)

( * ) Notice: Subject to any disclaimer, the term of this patent is extended or adjusted under 35 U.S.C. 154(b) by 0 days.

(21) Appl. No.: 09/371,643

(22) Filed: Aug. 10, 1999

(51) Int. Cl.$^7$ .................................................. B60R 21/26
(52) U.S. Cl. ....................... 280/737; 280/741; 137/68.23; 220/89.2
(58) Field of Search ........................... 280/737, 736, 280/741, 742; 137/68.19, 68.21, 68.23, 68.26, 68.11; 220/89.2, 89.1

(56) References Cited

U.S. PATENT DOCUMENTS

| 5,659,295 | * | 8/1997 | Renfroe et al. ............ 280/737 X |
| 5,669,631 | * | 9/1997 | Johnson et al. ............ 280/737 X |
| 5,938,235 | * | 8/1999 | Butt ............................ 280/737 |
| 6,029,995 | * | 2/2000 | Fink ........................... 280/737 |
| 6,042,146 | * | 3/2000 | Bauer et al. ................ 280/737 |
| 6,062,599 | * | 5/2000 | Forbes et al. .............. 280/737 |

\* cited by examiner

Primary Examiner—J. J. Swann
Assistant Examiner—F. Zeender
(74) Attorney, Agent, or Firm—Tarolli, Sundheim, Covell, Tummino & Szabo L.L.P.

(57) ABSTRACT

An inflator (10) for providing inflation fluid to inflate an inflatable vehicle occupant protection device includes a pressure vessel (12) defining a chamber (30) for inflation fluid. The pressure vessel (12) has a passage (48) for inflation fluid flow from the chamber (30). A burst disk (52) blocks fluid flow through the passage (48). A support (62) has a tubular portion (64) with a first end (67) spaced apart from the burst disk (52) prior to the inflation fluid entering the pressure vessel (12) and a second end (68) opposite the first end. The burst disk (52) deforms into contact with the first end (67) due to the pressure of the inflation fluid when the inflation fluid is disposed in the chamber (30). An actuatable igniter assembly (60) bursts the burst disk (52) to enable fluid to flow from the chamber (30) through the passage (48). The second end (68) of the tubular portion (64) engages the igniter assembly (60). An igniter retainer (78) has a tubular portion (82) aligned with the tubular portion (64) of the support (62). The igniter assembly (60) is located in the first and second tubular portions (64, 82) and retained in the position between the support (62) and the igniter retainer (78).

6 Claims, 2 Drawing Sheets

INFLATOR

FIELD OF THE INVENTION

The present invention relates to an inflator which provides inflation fluid to inflate an inflatable vehicle occupant protection device.

BACKGROUND OF THE INVENTION

An inflatable vehicle occupant protection device, such as a side curtain or an air bag, is inflated upon the occurrence of a vehicle condition requiring inflation of the side curtain or air bag. When inflation is required, an inflator is actuated to provide inflation fluid which inflates the side curtain or air bag into the vehicle occupant compartment.

The inflator includes a pressure vessel defining a chamber with a passage for inflation fluid flow from the chamber. A rupturable burst disk is fixed to the container to block flow of inflation fluid through the passage. The inflator further includes an electrically actuatable igniter assembly which, when actuated, bursts the burst disk to enable fluid to flow from the chamber through the passage.

SUMMARY OF THE INVENTION

The present invention is an inflator for providing inflation fluid to inflate an inflatable vehicle occupant protection device. The inflator includes a pressure vessel defining a chamber for the inflation fluid. The pressure vessel has a passage for inflation fluid flow from the chamber. A burst disk blocks fluid flow through the passage.

A support has a first tubular portion with a first end spaced apart from the burst disk prior to the inflation fluid entering the pressure vessel and a second end opposite the first end. The burst disk deforms into contact with the first end of the first tubular portion due to the pressure of the inflation fluid when the inflation fluid is disposed in the chamber. An actuatable igniter assembly bursts the burst disk to enable fluid to flow from the chamber through the passage. The second end of the first tubular portion engages the igniter assembly. An igniter retainer has a second tubular portion aligned with the first tubular portion. The igniter assembly is located in the first and second tubular portions and is retained in position between the support and the igniter retainer.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
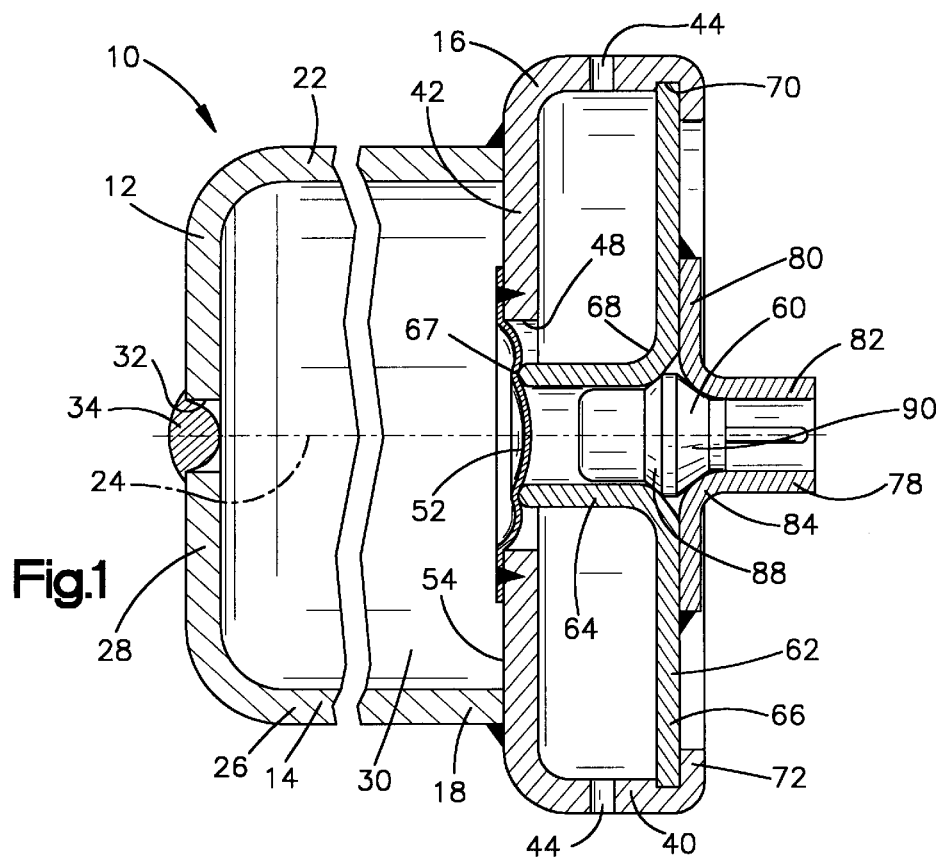
FIG. 1 is a schematic sectional view of an inflator of the present invention.

The present invention relates to an inflator for providing inflation fluid to inflate an inflatable vehicle occupant protection device, such as a side curtain or air bag. As representative of the present invention, FIG. 1 illustrates schematically an inflator 10 for providing inflation fluid to inflate an inflatable vehicle occupant protection device (not shown).

The inflator 10 includes a pressure vessel 12 having a generally elongate configuration including a main body portion 14 and an end cap 16. The end cap 16 is affixed to an open end 18 of the main body portion 14 by friction welding. The end cap 16 could, however, be connected to the main body portion 14 in any manner known in the art, such as using laser welds, brazing or screw threads. The end cap 16 is preferably made by stamping.

The main body portion 14 of the pressure vessel 12 has a cylindrical configuration including an axially extending cylindrical side wall 22. The side wall 22 is centered on a longitudinal central axis 24 of the inflator 10. A second end portion 26 of the main body portion 14 is closed by an end wall 28.

The side wall 22 and the end wall 28 define a chamber 30 in the pressure vessel 12. The chamber 30 contains pressurized inflation fluid. The inflation fluid stored in the chamber 30 preferably consists essentially of a helium at storage pressure within the range of about 4,000 psi to about 7,000 psi. The inflation fluid may, however, have any other composition and storage pressure suitable for inflating the inflatable vehicle occupant protection device.

The end wall 28 has an opening 32 (FIG. 2) through which inflation fluid flows to fill the pressure vessel 12 with inflation fluid. A plug 34 (FIG. 1) closes the opening 32 after the inflator 10 has been filled with inflation fluid.

The end cap 16 (FIG. 1) of the pressure vessel 12 has a generally cup-shaped configuration including an axially extending cylindrical side wall 40 and an end wall 42. The end wall 42 is connected with the main body portion 14. An annular array of inflation fluid outlet passages 44 is formed in the side wall 40 of the end cap 16. The outlet passages 44 direct inflation fluid to the inflatable occupant restraint device.

A passage 48 extends axially through the end wall 42 of the end cap 16. The passage 48 is centered on the axis 24. The passage 48 conducts inflation fluid from the chamber 30 to the outlet passages 44.

A rupturable burst disk 52 (FIG. 1) is affixed to a surface 54 of the end wall 42 by a laser weld. The burst disk 52 could, however, be connected to the surface 54 in any manner well known in the art, such as by brazing, projection welding or electron beam welding. The burst disk 52 is centered on the axis 24 and blocks the flow of inflation fluid through the passage 48 and to the outlet passages 44.

An igniter assembly 60 centered on the axis 24 is housed in a support 62 which supports the burst disk 52 when the pressure vessel 12 is filled with inflation fluid. The igniter assembly 60 bursts the burst disk 52 when actuated to enable fluid flow from the chamber 30.

Figure 2:
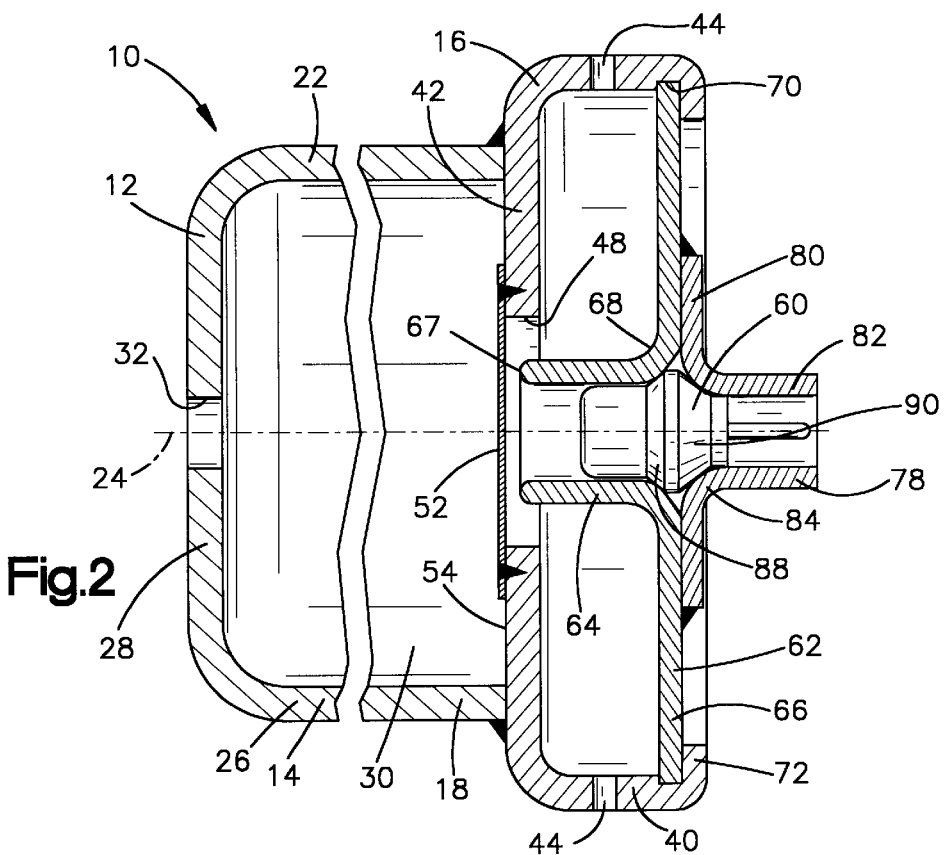
FIG. 2 is a view similar to FIG. 1 showing the inflator prior to inflation fluid entering the inflator.

The support 62 is preferably formed by stamping or drawing and has a tubular portion 64 extending along the axis 24 from a radially extending base portion 66. The burst disk 52 is spaced from an end 67 of the tubular portion 64 prior to the pressure vessel 12 being filled with inflation fluid, as shown in FIG. 2. The burst disk 52 deforms into engagement with the end 67 of the tubular portion 64 after the pressure vessel 12 has been filled with inflation fluid, as shown in FIG. 1.

At the end opposite the end 67, the tubular portion 64 (FIG. 1) includes a flared end part 68. The flared end part 68 flares radially outwardly to merge with the base portion 66. The flared end part 68 engages the igniter assembly 60.

The end cap 16 has a circumferential groove 70 for receiving a radially outer edge of the base portion 66 of the support 62. A portion 72 of the end cap 16 extends axially from the groove 70 and is subsequently crimped around the base portion 66 of the support 62 to hold the support in place in the end cap 16. Alternatively, the support 62 may be welded to the end cap 16.

An igniter retainer 78 has a radially extending base portion 80 secured to the base portion 66 of the support 62. A tubular portion 82 of the retainer 78 is aligned with the tubular portion 64 of the support 62 and is centered on the axis 24. The igniter retainer 78 is preferably formed by stamping or drawing.

The tubular portion 82 of the retainer 78 has a flared end part 84. The flared end part 84 flares radially outwardly from the tubular portion 82 to merge with the base portion 80. The flared end part 84 engages the igniter assembly 60.

The flared end part 68 of the support 62 engages a surface 88 of the igniter assembly 60 which faces toward the burst disk 52. The flared end part 84 of the igniter retainer 78 engages a surface 90 of the igniter assembly 60 which faces away from the burst disk 52. The igniter assembly 60 is thereby retained in the tubular portions 64 and 82.

When the chamber 80 is not filled with inflation fluid, as shown in FIG. 2, the burst disk 52 is a flat disk. The burst disk 52 is spaced from the tubular portion 64 of the support 62. During the subsequent loading of the burst disk 52 by the pressure of the inflation fluid, the burst disk is stressed and undergoes plastic deformation into engagement with the tubular portion 64, as shown in FIG. 1. The burst disk 52 deforms from the flat disk shown in FIG. 2 into the shape shown in FIG. 1.

Figure 3:
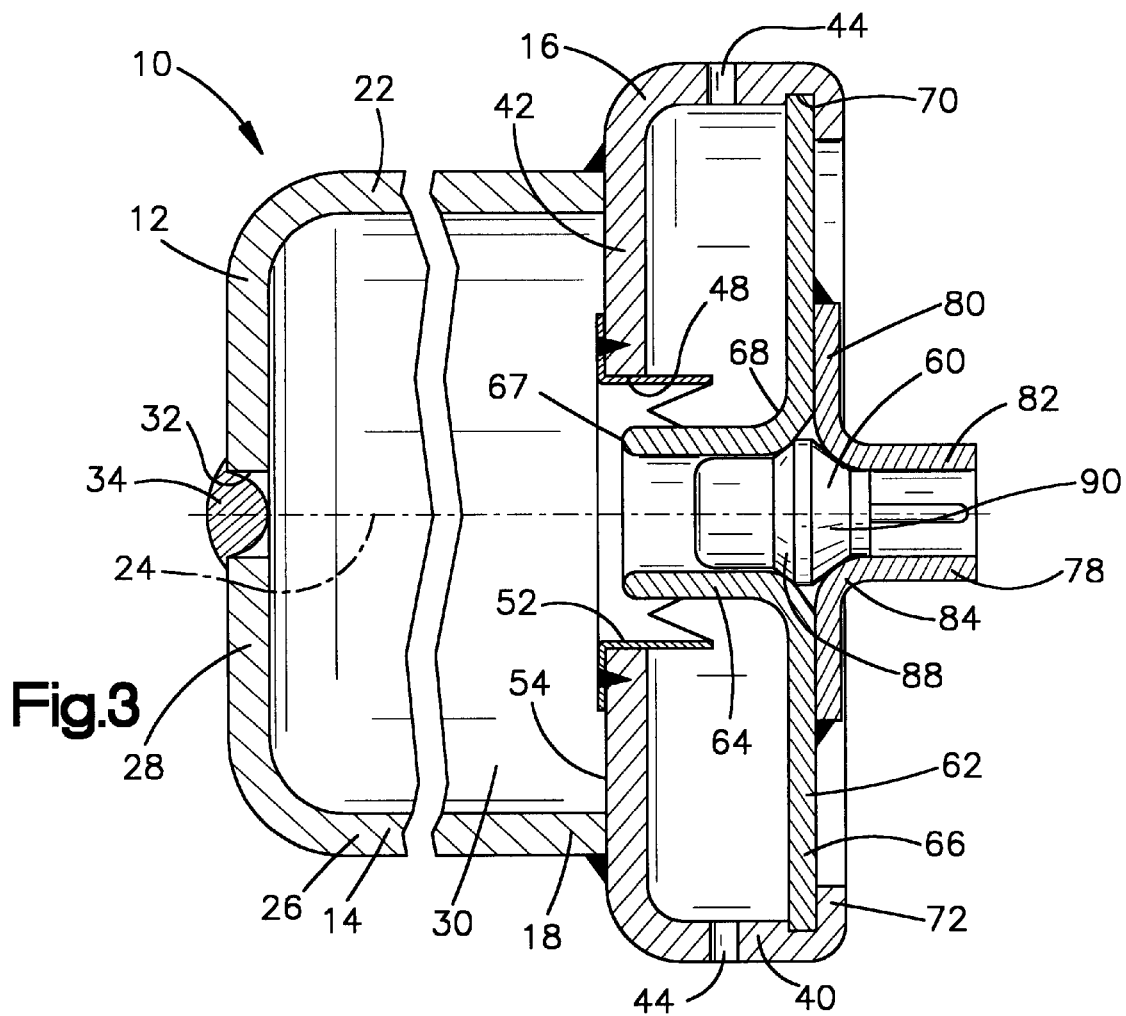
FIG. 3 is a view similar to FIG. 2 showing the inflator after an igniter assembly of the inflator has been actuated.

Upon receiving an electric signal from a sensor (not shown), the igniter assembly 60 is actuated in a known manner to produce a shock wave and combustion gas. The pressure of the combustion gas, coupled with the shock wave, acts on the burst disk 52 to burst the burst disk, as shown in FIG. 3, and enables fluid to flow from the chamber 30 through the passage 48. Fluid flows through the passage 48 and through the outlet passages 44 to the inflatable occupant restraint device (not shown).

From the above description of the invention, those skilled in the art will perceive improvements, changes and modifications. Such improvements, changes and modifications within the skill of the art are intended to be covered by the appended claims.

Having described the invention, the following is claimed:

1. An inflator for providing inflation fluid to inflate an inflatable vehicle occupant protection device, said inflator comprising:
   a pressure vessel defining a chamber for inflation fluid, said pressure vessel having a passage for inflation fluid flow from said chamber;
   a burst disk blocking fluid flow through said passage;
   a support having a first tubular portion with a first end spaced apart from said burst disk prior to said inflation fluid entering said pressure vessel and a second end opposite said first end, said burst disk deforming into contact with said first end of said first tubular portion due to the pressure of said inflation fluid when said inflation fluid is disposed in said chamber;
   an actuatable igniter assembly which, when actuated, bursts said burst disk to enable fluid to flow from said chamber through said passage, said second end of said first tubular portion engaging said igniter assembly;
   an igniter retainer having a second tubular portion aligned with said first tubular portion;
   said igniter assembly being located in said first and second tubular portions and retained in position between said support and said igniter retainer.

2. An inflator as defined in claim 1 wherein said burst disk, said igniter assembly, said first tubular portion and second tubular portion are centered on the same axis.

3. An inflator as defined in claim 1 wherein said support has a first base portion which extends radially outward from said second end of said first tubular portion and said igniter retainer has a second base portion which extends radially outward from an end of said second tubular portion.

4. An inflator as defined in claim 3 wherein said first tubular portion flares radially outwardly from said second end of said first tubular portion to merge with said first base portion and said second tubular portion flares radially outwardly from said end of said second tubular portion adjacent said first base portion to merge with said second base portion.

5. An inflator as defined in claim 4 wherein the parts of said first and second tubular portions which flare outwardly engage opposite facing surfaces of said igniter assembly.

6. An inflator as defined in claim 5 wherein said first and second base portions are secured together.

* * * * *